Sept. 26, 1967 R. G. AMES 3,343,202
SWINGABLE ARCUATE TROWELLING BLADE FOR MASTIC APPLICATOR
Filed Dec. 27, 1965 4 Sheets-Sheet 1

INVENTOR
ROBERT G. AMES
BY William R. Piper
ATTORNEY

Sept. 26, 1967    R. G. AMES    3,343,202
SWINGABLE ARCUATE TROWELLING BLADE FOR MASTIC APPLICATOR
Filed Dec. 27, 1965    4 Sheets-Sheet 2
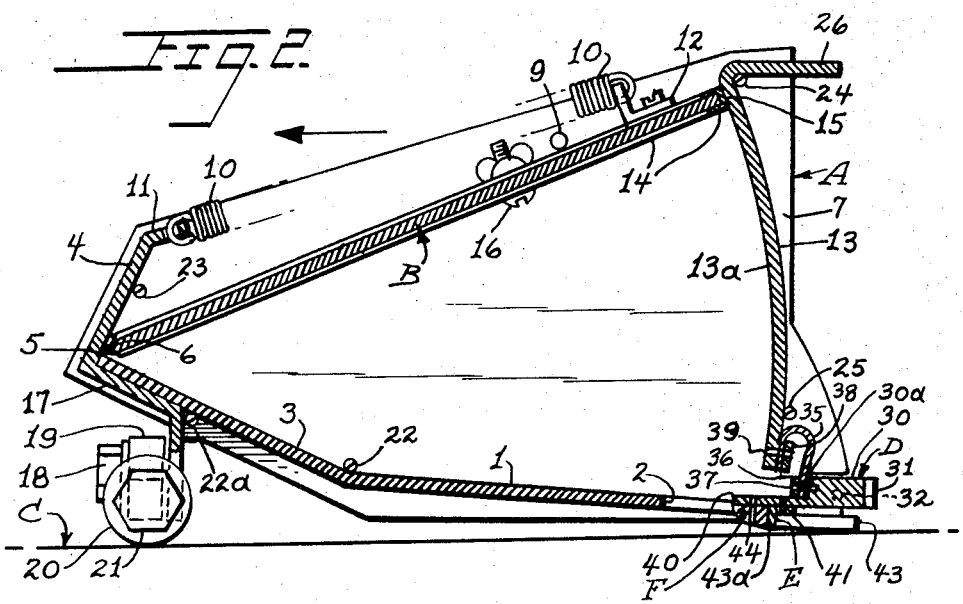
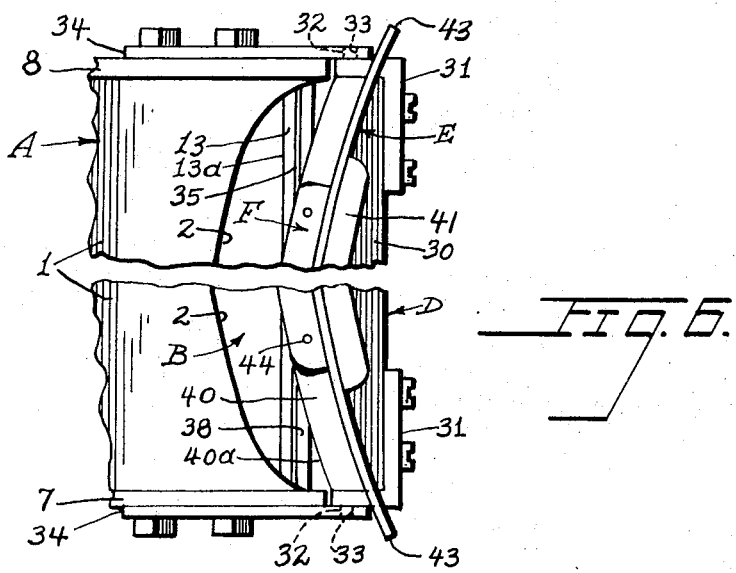
INVENTOR
ROBERT G. AMES
BY William R. Piper
ATTORNEY Sept. 26, 1967 R. G. AMES 3,343,202
SWINGABLE ARCUATE TROWELLING BLADE FOR MASTIC APPLICATOR
Filed Dec. 27, 1965 4 Sheets-Sheet 3

INVENTOR
ROBERT G. AMES
BY William R. Piper
ATTORNEY

Sept. 26, 1967 R. G. AMES 3,343,202
SWINGABLE ARCUATE TROWELLING BLADE FOR MASTIC APPLICATOR
Filed Dec. 27, 1965 4 Sheets-Sheet 4
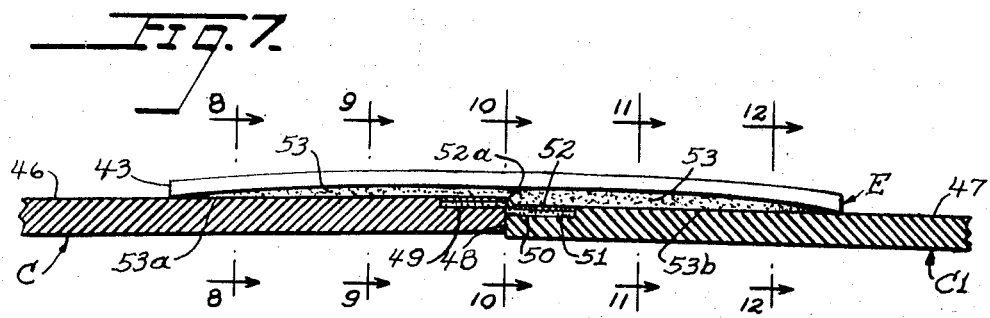
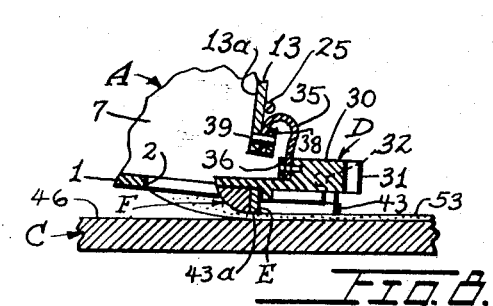
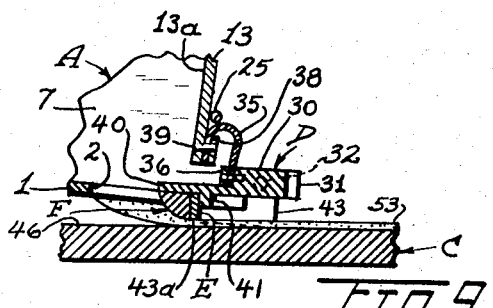
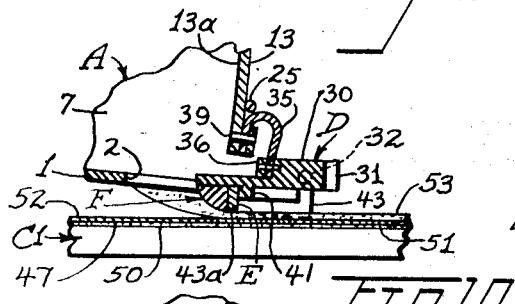
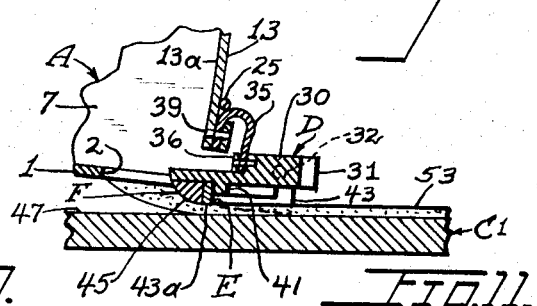
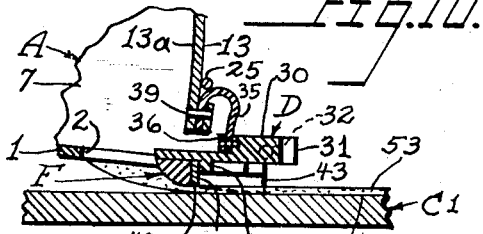
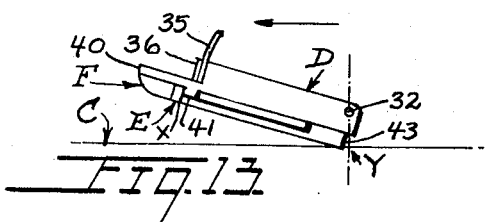
INVENTOR
ROBERT G. AMES
BY William R. Piper
ATTORNEY

United States Patent Office 3,343,202
Patented Sept. 26, 1967

3,343,202
SWINGABLE ARCUATE TROWELLING BLADE
FOR MASTIC APPLICATOR
Robert G. Ames, Hillsborough, Calif., assignor to Ames Taping Tool Systems Manufacturing Co., Oak Brook, Ill.
Filed Dec. 27, 1965, Ser. No. 517,517
13 Claims. (Cl. 15—595)

The present invention relates to improvements in a trowelling blade for mastic applicator, and it consists in the combination, construction and arrangement of parts as hereinafter described and claimed.

In six of my patents I disclose flexible trowelling blades of different types which are used in various kinds of mastic-applying tools for trowelling the outer surface of the layer of mastic that is being applied to conceal a joint formed by the abutting edges of two adjacent pieces of wallboard. As the curvature of these trowelling bars or blades was increased the pressure applied by the blade upon the mastic layer was also increased at an undesirably increasing rate.

The six patents are as follows:

My Patent No. 2,571,096, formed Oct. 16, 1951, on a finishing tool, made use of a deformable trailing bar for trowelling the outer surface of the mastic layer as it was being made by the tool. A plurality of clips were mounted on the bar for supporting it and spring means was used to oppose the flexing of the blade into a greater curvature. As the arc of the bar became more pronounced due to the pressure of the mastic and or high ridges on the wallboard being exerted against it, the spring pressure against the bar for opposing its flexing into a greater arc, was increased.

My Patent No. 2,666,323, issued Jan. 19, 1954, for a mastic-applying and finishing tool, disclosed a trowelling bar mounted in a groove provided in a flexible guide strip. The trowelling bar smoothed and crowned the outer surface of the mastic layer being applied by the tool. As the thickness of the mastic layer increased, curvature of the trowelling bar would also be increased and so would the arc of the flexible guide strip. Spring pressure was applied on the guide strip to resist the increased arcing of the bar and thus the pressure was increased as the curvature of the bar and the guide strip became greater. The same type of trowelling bar and flexible guide strip was also shown in my Patent No. 2,824,442, issued Feb. 25, 1958, and my Patent No. 2,889,699, issued June 9, 1959.

A manually controlled means is shown in my Patent No. 2,984,857, issued May 23, 1961, on a mastic applicator and finishing tool with a trowelling bar pressure and curvature regulator, for varying the yielding pressure exerted against the flexible guide strip and trowelling bar to oppose the tendency of the mastic to flex the bar into a greater curvature.

Another form of trowelling bar was disclosed in my Patent No. 2,711,098, issued June 21, 1955, on a mastic-applying and surfacing-finishing tool. The trailing wall of the tool had a groove for receiving a flexible trowelling bar and spring means applied yielding pressure against the bar and near its ends for opposing the curvature of the bar being increased due to the pressure of the mastic increasing as the layer of mastic was being formed by the tool.

An object of my invention is to provide a preformed arcuate trowelling blade that is rotatably mounted near each end to the side walls of the mastic applying tool. The arcuate trowelling blade lies in a plane that is parallel to one that includes the entire length of the axis of rotation and that extends between the aligned rotatable supports for the blade. Normally the ends of the arcuate blade will straddle the line of the wallboard joint and will contact with the wallboard surfaces disposed on each side of the joint so as to feather the two side edges of the mastic layer being formed by the tool as it is moved along the joint. The arcuate portion of the blade lying between the blade ends is free to contact and ride over any high or low point of the wallboard surface lying in the path of the blade. The high point or ridge will cause by lever action, the blade to rotate about its ends and the arcuate shape of the blade will form a crown or flat or reverse crown to the layer of mastic whose outer surface is tangent to the top of the high point and therefore the mastic layer will completely conceal the high point. The feathered edges of the mastic layer will merge into the wallboard surfaces without any lines being noticeable. The trowelling blade arc may lead or trail the direction of travel of the mastic applying tool. It is more desirable that the blade arc lead the direction of tool travel.

The advantage of the present arcuate blade rotatably supported near its ends over the flexible blades or bars and their flexible holders disclosed in the above mentioned six patents is that my present arcuate blade is free to rotate about its rotatable end supports without substantially increasing any pressure exerted against the blade. In fact, less blade pressure is exerted on a high wallboard ridge being covered by the mastic layer than on a joint without a ridge. This is desirable.

My arcuate blade does not flex to change the contour of the arc. It merely rotates about its ends and the plane of the blade can swing with the blade from a position making a slight angle with the outer wallboard surface into positions where the angle is more pronounced due to the blade riding over a high wallboard point that lies between the blade ends. As the angle of the blade plane increases, the arc of the crown of the mastic layer also increases. This is automatically accomplished because the arcuate blade by lever action and friction tends to return to a position where the blade plane extends at the lowest possible angle to the contacted wallboard surface.

The device is simple in construction and is durable and efficient for the purpose intended.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 2 is an enlarged transverse section taken along the line 2—2 of FIGURE 1.

FIGURE 6 is an enlarged bottom view of end portions of the arcuate trowelling blade and blade holder and illustrates how the blade holder is pivotally supported at points adjacent to the ends of the arcuate trowelling blade.

FIGURE 7 is a schematic rear elevation of the arcuate trowelling blade shown slightly rotated at an angle about its pivotal ends so as to accommodate a raised portion in the wallboard joint.

Figure 1:
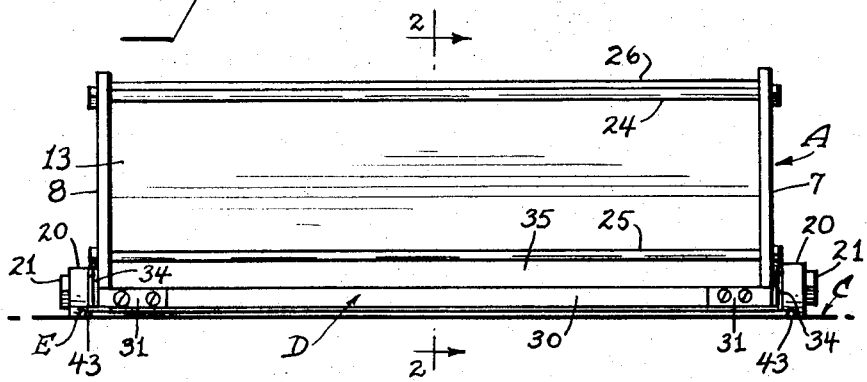
FIGURE 1 is a rear elevation of the device.

FIGURES 8 to 12 inclusive are schematic transverse sections taken along the lines 8—8, 9—9, 10—10, 11—11 and 12—12 of FIGURE 7.

FIGURE 13 is a schematic view of the pivoted blade holder and arcuate trowelling blade and shows the pivot points for the blade holder to illustrate the operation of these parts.

While I have shown only the preferred form of my invention, it should be understood that various changes, or modifications, may be made within the scope of the annexed claims without departing from the spirit thereof.

*Detailed description*

In carrying out my invention I provide a mastic applying tool that incorporates my new type of arcuate-shaped trowelling bar. I will first describe the general construction of the mastic applying tool and then describe in detail the particular construction of the arcuate trowelling bar or blade and how it is rotatably supported at points adjacent to its ends. The mastic applying tool is indicated generally at A and it has a bottom wall 1 that has an arcuate-shaped mastic outlet opening 2 and an upwardly inclined portion 3. In reality the rear arcuate edge 2 of the bottom wall 1 provides one side of the mastic outlet opening and the arcuate trowelling blade with its associate parts, which is to be described hereinafter, forms the other side of the mastic outlet opening. The mastic applying tool A has a front wall 4 and this wall extends at an angle to the upwardly inclined bottom wall portion 3. The two walls 3 and 4 form a pivot line 5 at the juncture of their inner surfaces and a pressure plate B has a chamfered end 6 that is fulcrumed at the pivot line 5, see FIGURE 2.

Figure 3:
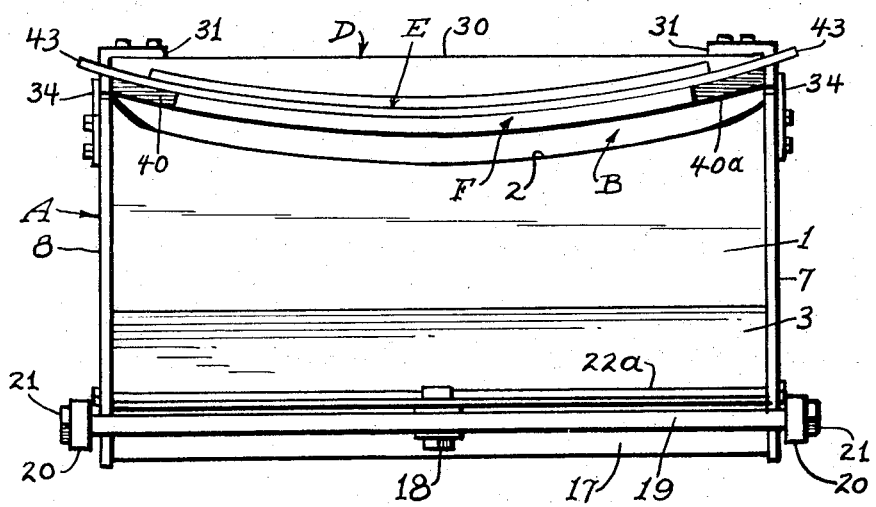
FIGURE 3 is a bottom plan view of the device on the same scale as FIGURE 1.

The mastic applying tool A has sides 7 and 8, see FIGURE 3, and these sides carry inwardly extending stops 9 that limit the upward swinging of the pressure plate B, in the tool, see FIGURE 2. A pair of coil springs 10 have one of their ends secured to projections 11 that are integral with the front wall 4. The other ends of the coil springs 10 are attached to brackets 12 and these brackets in turn are secured to the pressure plate at points disposed near to the outer end of the plate. The tool has a rear arcuate wall 13 that extends between the side plates 7 and 8 and the center of the arc coincides with the pivot line 5. The pressure plate B is preferably provided with a rubber lined edge 14 on three of its sides so that this edge will act as a sealing gasket between the side edges of the pressure plate and the adjacent inner surfaces of the side walls 7 and 8 and between the outer edge 15 of the pressure plate and the adjacent inner arcuate surface 13a of the arcuate rear wall 13. Mastic is received in the collapsible compartment formed by the bottom wall 1, the bottom wall inclined portion 3, the rear arcuate wall 13, the side walls 7 and 8 and the pressure plate B.

A handle of any type, not shown, may be secured to the pressure plate B by screws 16 or other suitable fastening means. In my Patents No. 2,889,699, issued June 9, 1959, and No. 2,889,965, issued June 9, 1959, I show two different types of handles which are secured to the mastic pressure plate. In my Patent No. 2,984,857, issued May 23, 1961, I do not disclose any particular type of handle to be attached to the pressure plate.

The front of the tool is supported above the surface of the wallboard C in FIGURE 2 by a bracket 17 that is secured to the inclined portion 3 of the bottom wall 1. FIGURE 3 shows the bracket 17 as extending throughout the width of the bottom wall and as carrying a cap screw 18 at its center. A transversely extending axle 19 has its center pivotally connected to the center of the bracket 17 by the cap screw 18 or other suitable means. Wheels or rollers 20 are mounted at the outer ends of the axle 19 and cap screws 21 or other suitable rotatable means are used for rotatably supporting the wheels. The sides 7 and 8 may be secured to the bottom wall 1 and to the rear arcuate wall 13 by any suitable fastening means. I show a number of tie rods 22, 22a, 23, 24 and 25 for securing the parts together, see FIGURE 2. The top of the arcuate rear wall 13 has a rearwardly extending lip 26.

Figure 5:
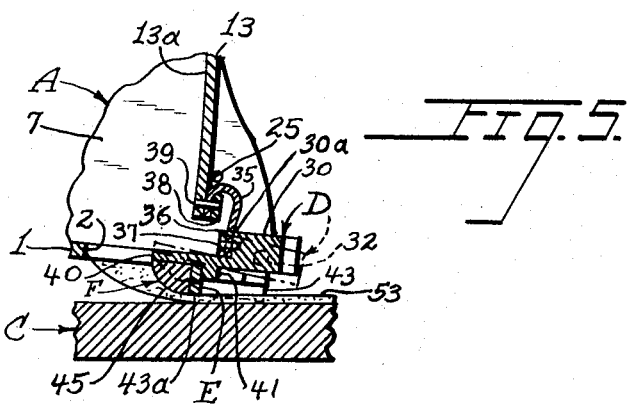
FIGURE 5 is a detailed section of the trowelling blade holder and trowelling blade and shows them in two different angular positions, one in full lines corresponding to the similar parts in FIGURE 2, and the other in dot-dash lines.

I do not wish to be confined to any particular type of mastic applying tool. Broadly speaking the tool A can be of any type that will hold mastic and has a discharge opening 2 for the mastic. I will now describe the particular construction of the arcuate trowelling bar or blade that has its ends rotatably mounted in the sides 7 and 8 of the mastic applying tool A. In FIGURES 2 and 5, I show the arcuate trowelling blade holder D in cross-section. FIGURES 1 and 3 illustrate the arcuate trowelling blade E as extending from side to side of the mastic applying tool. An elongated blade-carrying member 30 has its ends mounted in end pieces 31, see FIGURE 6 and these end pieces have outwardly extending trunnions 32 that are rotatably mounted in openings 33 provided in bearing plates 34 that in turn are connected to the sides 7 and 8 of the mastic applying tool A. FIGURE 5 shows the elongated blade carrying member 30 as having an elongated shoulder 30a against which the lower edge of a flexible wall portion 35 bears. An inner strip 36 extends along the inner surface of the lower edge of the flexible wall portion 35 and fastening pins 37 are used to secure the strip and the flexible wall portion 35 to the elongated wall portion 30a.

The upper end of the flexible wall portion 35 is curved back on itself and is held against the outer surface of the rear arcuate wall 13 by a strip 38, see FIGURE 5 and fastening pins 39 or other suitable fastening means. The elongated blade carrying member 30 has a lip 40, see FIGURE 2, that is integral with the blade holder D and the plane of the lip when in normal position lies substantially in the same plane as that of the bottom wall 1 of the mastic applying tool A. FIGURE 3 shows a bottom plan view of the elongated blade carrying member 30 and this figure taken together with FIGURE 6 shows that the lip 40 has an arcuate rear edge 40a that substantially parallels the arcuate edge 2 of the mastic outlet opening for the mastic applying tool A.

The arcuate trowelling blade is shown at E in FIGURE 3 and it is formed into an arc with the upper edge of the blade bearing against the underside of the lip 40, as shown in FIGURE 5. The blade holder D has an integral arcuate rib 41 on its under side and the inner arcuate face of the blade bears against the arcuate edge of this rib. A shoe or rider F is secured to the underside of the lip 40 and has an arcuate edge 42 that bears agianst the convex face of the trowelling blade to hold it against the arcuate edge of the rib 41. The outer ends 43 of the blade E project beyond the sides 7 and 8 of the mastic applying tool A.

When the elongated blade-carrying member 30 is in normal position as shown by the full lines in FIGURE 5, the lip 40 will lie in a plane that substantially coincides with the plane of the bottom wall 1 and the lower trowelling edge 43a of the blade E will lie in a plane that parallels the plane of the bottom wall 1.

I provide a rider shoe F, see FIGURES 3 and 5 that is secured to the underside of the lip 40 by pins 44 or other suitable fastening means and the shoe is arcuate-shaped so as to abut the forward arcuate wall of the trowelling blade E. The rider or shoe F may be integral with the lip 40 and the shoe has a cam surface 45 with one edge lying flush with the lower edge 43a of the trowelling blade B. The purpose of the shoe F is to lead the blade over uneven surfaces if there are any on the wallboard C and to rotate the blade holder D.

In the schematic showing in FIGURE 13, I have shown the mid-portion X of the blade E raised above the wallboard C and an end 43 of the blade contacting with the wallboard surface. This is the approximate position assumed by the blade as the device is moved to the left in the figure and mastic is fed from it. The ends 43 of the blade E will drag on the wallboard surface and the distance between each blade end at Y and its adjacent pivot point 32 can be considered the short arm of a lever. The long arm of the lever would be from the pivot point 32 to the blade point X. The frictional drag of the blade ends 43 on the wallboard will cause the short lever arm to tend to swing in a counter-clockwise direction about the pivot 32 and exert a downward swing on the long arm to tend to move the blade point X toward the wallboard. This will cause the blade to exert a certain compressive force on the layer of mastic being delivered.

Now if the center X of the blade is raised still higher by the shoe F riding over a higher point, the short arm of the lever will be swung clockwise about the pivot 32 and will permit the pivot to move closer to the wallboard. The drag on the blade ends will be in a direction closer to a horizontal line that passes through the pivot 32 and the drag effect to rotate the long arm decreases and the rotative force of the short lever arm to rotate the long lever arm downwardly will be less. This is desirable because as the crown of the blade E swings, more mastic is ejected from the tool and there should be less force exerted to swing the point X of the blade toward the wallboard surface.

FIGURE 7 shows two sections of wallboard C and C1 and the outer surface 46 of the wallboard section C is shown out of line with the outer surface 47 of the wallboard section C1. The two wallboard sections abut each other along a line joint indicated at 48. The wallboard sections C and C1 may be provided with grooves 49 and 50 respectively and a previous combination mastic applying and taping machine has applied a layer of mastic 51 in the registering grooves 49 and 50 and has also applied a tape 52 over the mastic layer.

Inasmuch as the abutting edges of the two wallboard sections C and C1 do not line up with each other, then the outer surface 46 of the wallboard section C will be out of line with the outer surface 47 of the wallboard section C1. The outer surface 46 is shown to be at a higher elevation than the surface 47 and this is likely to form a ridge 52a in the tape 52. The purpose of the present tool is to cover the tape 52 with an outer layer of mastic 53 and to cause the side edges of the mastic layer 53 to feather out at 53a and 53b so that the outer mastic layer will merge into the outer surfaces 46 and 47 of the two wallboard sections C and C1.

Figure 4:
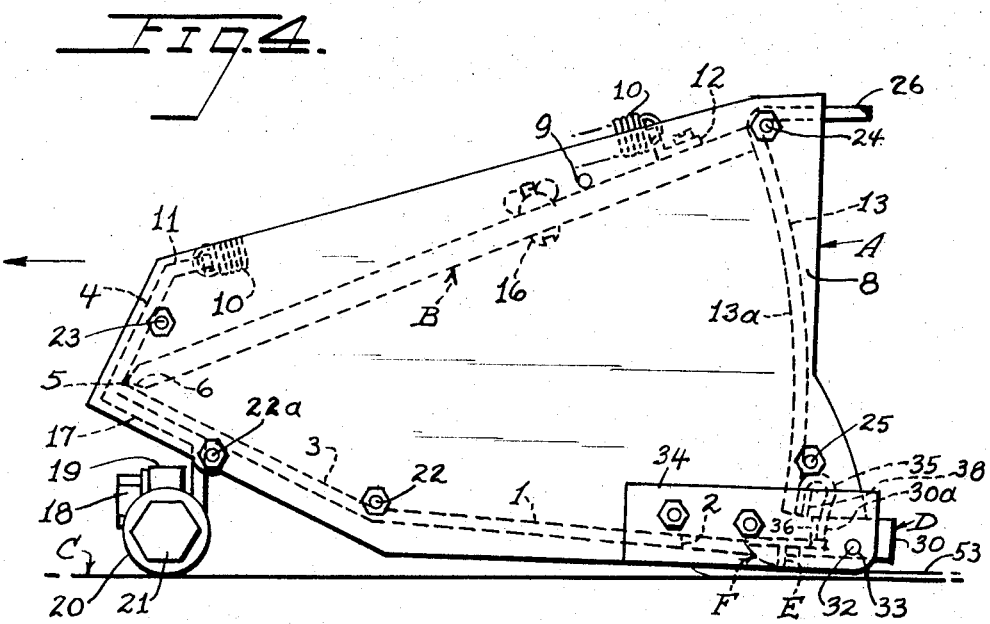
FIGURE 4 is an end elevation of the device on the same scale as FIGURE 2.

My arcuate trowelling blade E which is rotatable about its ends by the trunnions 32 is especially designed to automatically take care of any irregularities in the surface over which the tool is moved. In actual practice the tool is moved to the left in FIGURES 2 and 4 by means of a handle, not shown, and pressure is applied by the operator on the handle, or other means is used for moving the pressure plate B inwardly for forcing mastic out through the discharge opening 2. The trowelling blade E will form the discharge mastic into the outer mastic layer 53 having feathered edges 53a and 53b, as shown in FIGURE 7. As the shoe F rides on the ridge 52a of the tape 52, it will swing the blade E about its end trunnions 32 and form an opening between the blade and the wallboard surfaces 46 and 47 that will determine the thickness and shape of the outer layer of mastic 53 as well as automatically feather the edges of the mastic layer at 53a and 53b. In theory there will be no mastic covering the ridge 52a because the blade E will contact with this ridge. In practice the viscosity of the mastic will cause a thin film to be deposited over the ridge.

The various transverse sections shown in FIGURES 8 to 12 inclusive are drawn to indicate the different thicknesses of the outer mastic layer 53 at different points. For example, the transverse sections in FIGURES 8 and 9 are taken to the left of the line joint 48 when looking at FIGURE 7. The thickness of the outer mastic layer 53 in FIGURE 8 is less than the thickness of the same layer in FIGURE 9. FIGURE 10 is taken at the line joint 48 and the rider or shoe F will tilt the arcuate trowelling blade E about its ends trunnions 32 into the angular position shown. The wallboard surface 46 is shown in FIGURE 8. The schematic showing is exaggerated so that the angle made by the trowelling blade E can be clearly indicated. The lower edge 43a of the trowelling blade will form an arc whose ends lie flush with the wallboard surfaces 46 and 47 and whose center is substantially tangent to the ridge 52a.

The other two transverse sections, see FIGURES 11 and 12, are taken to the right of the transverse section 10—10 in FIGURE 7 and indicate the different thicknesses of the outer layer of mastic 53 overlying the wallboard C1. The thickness of the outer mastic layer 53 shown in FIGURE 11 will be greater than the thickness of the same layer shown in FIGURE 12. If a person examines the wallboard surfaces 46 and 47 after the outer layer of mastic has been applied, he will not see the ridge 52a on the tape 52 nor will he see where the feathered edges 53a and 53b of the mastic layer merge into the outer surfaces 46 and 47 respectively.

The pressure of the mastic in being forced through the outlet opening 2 in the bottom wall 1 of the mastic applying tool A will exert a force on the upper surface of the lip 40 and tend to move the lip downwardly in FIGURE 5 and to rotate the arcuate trowelling blade holder D in a counter-clockwise direction. This force along with the less force friction on the ends of the blade will yieldingly hold the rider or shoe F down upon any ridge or high point on the wallboard surfaces disposed adjacent to the line joint 48. The mastic in the tool body has enough viscosity to lift the rider or shoe F and the blade E above the ridge 52a so that the ridge will be covered by a thin layer of mastic.

The flexible wall portion 35 of the tool will permit the arcuate trowelling blade holder D to rotate about the trunnions 32 and the operator will not need to examine the angular swinging of the arcuate trowelling blade E as the blade moves over any uneven surface because the rider or shoe F will automatically lead the blade holder D and the arcuate blade E so as to form an outer layer of mastic that will have a transverse crown determined by three points for covering all portions between the ends of the blade and for feathering the edges of the mastic layer so that they will merge into the wallboard surfaces 46 and 47. The three points that contact the blade so as to swing it about its pivotal ends are the two contacts made by the ends of the blade with the adjacent wallboard surface, and the contact made by a portion of the blade lying between the blade ends, this third contact being either with a high or a low point on the wallboard surface lying between the blade ends.

I claim:
1. In a mastic applicator for applying mastic over a wallboard joint:
 (a) a mastic holding compartment having a mastic discharge opening in its bottom wall that extends transversely to the line of travel of the applicator;
 (b) means for forcing mastic out through said discharge opening;
 (c) a trowelling bar constituting the trailing edge side of the discharge opening and extending transversely to the line of travel;
 (d) means for pivotally supporting said bar at its ends so that it can rotate about an axis that extends transversely to the line of movement, said bar lying in a plane that lies between the pivotal supporting means for said bar;
 (e) bar-swinging means adapted to contact with the highest point of the surface over which the tool moves and lying between the bar ends, said bar swinging means causing said bar to rotate about its pivotal supporting means into various angular positions as said means rides over a succession of high points on the surface over which it travels;
 (f) whereby said bar will trowel the outer surface of the layer of mastic issuing from said compartment and said discharge opening, this mastic layer covering the surface high points and the remaining surface lying between the pivotal bar supporting means.

2. In a mastic applicator for applying mastic over a wallboard joint:
(a) a mastic holding compartment movable over a surface and having a mastic discharge opening in its bottom wall that extends transversely to the line of travel;
(b) means for forcing mastic out through said discharge opening;
(c) an arcuate-shaped trowelling bar constituting the trailing edge side of the discharge opening;
(d) means for pivotally supporting said arcuate trowelling bar at its ends so that the bar can rotate about an axis that extends transversely to the line of movement of the tool; the arcuate trowelling bar lying in a plane that is coextensive with said axis of said bar pivotal supporting means with the normal position of the plane lying substantially in the same plane as the bottom wall of said tool; and
(e) bar-swinging means adapted to contact with the highest points of the surface over which the tool moves and lying between the bar ends, said bar-swinging means causing said bar to rotate about its pivotal supporting means into various angular positions as said means rides over a succession of high points on the surface in its travel;
(f) whereby said arcuate bar will trowel the outer surface of the mastic layer to conceal the surface high points and fill in the remaining surface lying between the bar ends.

3. The combination as set forth in claim 2; and in which
(a) the ends of said arcuate bar contact with the surface over which the tool is moved;
(b) the curvature of the arcuate bar causing the side edges of the mastic layer to be feathered regardless of the angle the arcuate bar plane makes the surface over which the tool moves.

4. The combination as set forth in claim 2; and in which
(a) said tool has a rear wall whose lower edge is spaced away from the axis of the plane in which the arcuate trowelling bar lies; and
(b) a flexible wall portion interconnecting said rear wall with said arcuate bar for permitting the rocking of the bar at its ends.

5. In a mastic-applying tool:
(a) mastic feeding means having an outlet opening for the mastic;
(b) means carried by the tool for spacing said opening a slight distance away from a wallboard surface when the tool is moved over a wallboard in a certain direction for applying a layer of mastic thereto;
(c) a trowelling blade forming the trailing edge of said outlet opening and having its ends contacting with the wallboard surface;
(d) means for pivotally securing the ends of said trowelling blade to said tool so that the pivotal axis of said blade extends transversely to the direction of movement of the tool when applying mastic to the wallboard surface;
(e) said trowelling blade lying in a plane that is parallel to said pivotal axis so that said blade is free to swing about said axis; and
(f) means associated with said blade and moved by the pressure of mastic in flowing through said outlet opening for yieldingly holding said blade in contact with the highest point of wallboard surface lying between said blade ends;
(g) whereby said blade will automatically rotate about its ends as the tool is moved over the wallboard so that the blade will always contact with the surface high or low point lying between the blade ends, the shape of the blade forming a crown on the mastic layer that will conceal the high or low point and the side edges of the mastic layer will merge into the wallboard surface.

6. The combination as set forth in claim 5: and in which
(a) a shoe is positioned adjacent to said blade and contacts with the highest point lying between the blade ends for swinging the blade about its ends into a position where it will be tangent to the said highest point and will form a crown on the mastic layer for concealing the said high point and for feathering the side edges of the mastic layer.

7. In a mastic-applying tool:
(a) a mastic-holding receptacle having a rear wall, two spaced apart sides and a bottom wall spaced a slight distance away from the surface of a wallboard when the tool is placed on the surface, the bottom wall having a rear edge that extends substantially transverse to the line of movement of the tool over the surface;
(b) a trowelling blade-carrying member extending between the sides of said receptacle and having a forward edge that is spaced from said bottom wall rear edge and cooperating therewith to form a portion of a mastic outlet opening for said receptacle; said member having an upper surface subjected to the mastic pressure in said receptacle;
(c) means for pivotally securing the ends of said member to said sides so that the pivotal axis of said member extends transversely to the line of tool movement; and
(d) an arcuate trowelling blade carried by said member, the arc of the blade lying in a plane that is parallel to said pivotal axis so that said member and blade plane are free to swing about said pivotal axis; the pressure of the mastic in the receptacle yieldingly holding said blade in contact with the highest surface point lying between said blade ends, the ends of said blade contacting with the wallboard surface;
(e) whereby said member and blade will automatically rotate about the ends of said member as the tool is moved over the wallboard surface so that said arcuate blade will always contact with the highest or lowest surface point lying between its ends and will form an arc between the high or low point and the blade ends so as to be tangent to the high or low point and form a crown on the mastic layer for concealing the high point and for feathering the side edges of the mastic layer.

8. The combination as set forth in claim 7: and in which
(a) a flexible mastic-retaining rear wall portion extends between said receptacle sides and has one edge connected to said member and has its opposite edge connected to said receptacle rear wall;
(b) whereby said flexible wall permits the swinging of said member about its pivotal axis.

9. In a mastic applying tool;
(a) means for extruding a layer of mastic onto a wallboard surface as the tool is moved over the surface in a certain direction; and
(b) an arcuate trowelling blade for forming a crown on the mastic layer and having its ends pivotally carried by the tool, said arcuate blade lying in a plane that is parallel to said pivotal axis and said axis extending transversely to the line of tool movement when dispensing the mastic layer onto the wallboard;
(c) whereby said blade will contact with any surface high point lying between the blade ends, the arcuate shape of the blade forming a shaped crown on the mastic layer that will conceal the high point, the ends of said blade contacting with said wallboard surface so as to feather the side edges of the mastic layer and cause them to merge into the adjacent wallboard surface.

10. The combination as set forth in claim 9: and in which
   (a) a shoe is positioned adjacent to said arcuate blade and contacts with the highest point lying between the blade ends for swinging the blade about its ends into a position where the blade will be tangent to the said highest point and will form a crown on the mastic for concealing said high point and for feathering the side edges of the mastic layer.

11. In a mastic applying tool:
   (a) a mastic-holding and dispensing receptacle having a rear wall, two spaced apart side walls and a bottom wall, said tool when applying mastic to a wallboard surface spacing said bottom wall a slight distance away from the surface;
   (b) said bottom wall having a rear edge that extends substantially transverse to the line of tool movement when applying mastic to the wallboard surface;
   (c) a trowelling blade-carrying member extending between the sides of said receptacle and having a portion forming a part of the receptacle bottom and contacted by the mastic in said receptacle, said member portion having a forward edge that is spaced from said bottom wall rear edge and cooperating therewith to form a trailing edge of a mastic outlet opening for said receptacle;
   (d) means for pivotally securing the ends of said member to said sides so that the pivotal axis of said member extends transversely to the line of tool movement;
   (e) an arcuate trowelling blade carried by said member, the arc of the blade lying in a plane that is parallel to said pivotal axis so that the member and blade plane are free to swing about said pivotal axis;
   (f) means for forcing mastic from said receptacle and out through said outlet opening; the pressure of the mastic in the receptacle yieldingly contacting with said member portion for swinging said member and blade for causing said blade to contact with any surface high point lying between said blade ends, the ends of said blade contacting with the wallboard surface;
   (g) whereby said member and blade will automatically rotate about the ends of said member as the tool is moved over the wallboard surface so that said arcuate blade will always contact with the highest surface point lying between its ends and will form an arc between the high point and blade ends so as to be tangent to the high point and form a crown on the mastic layer for concealing the high point and for feathering the side edges of the mastic layer.

12. The combination as set forth in claim 11: and in which
   (a) a shoe is positioned adjacent to said arcuate blade and contacts with the highest point lying between the blade ends for swinging the blade about its ends into a position where the blade will be tangent to the said highest point and will form a crown on the mastic for concealing the said high point and for feathering the side edges of the mastic layer.

13. The combination as set forth in claim 12: and in which
   (a) a flexible mastic-retaining rear wall portion extends between said receptacle sides and has one edge connected to said member and has its opposite edge connected to said receptacle rear wall.

References Cited

UNITED STATES PATENTS

| | | | |
|---|---|---|---|
| 2,413,684 | 1/1947 | Ames | 15—596 |
| 2,666,323 | 1/1954 | Ames | 15—596 |
| 2,824,442 | 2/1958 | Ames | 15—596 |
| 2,889,699 | 6/1959 | Ames | 15—595 |
| 2,984,857 | 5/1961 | Ames | 15—596 |
| 3,023,443 | 3/1962 | Brandeis | 15—560 X |
| 3,103,033 | 9/1963 | Ames | 15—596 X |
| 3,116,511 | 1/1964 | Honeland | 15—596 X |

CHARLES A. WILLMUTH, *Primary Examiner.*

R. I. SMITH, *Assistant Examiner.*